(12) United States Patent
Gasparovic et al.

(10) Patent No.: US 10,066,343 B2
(45) Date of Patent: Sep. 4, 2018

(54) ARTIFICIAL PAVERS AND METHODS FOR MANUFACTURING ARTIFICIAL PAVERS

(71) Applicant: Tarkett Inc., Farnham, Quebec (CA)

(72) Inventors: Mike Gasparovic, Hunt Valley, MD (US); James Fox, Hunt Valley, MD (US); Drew Beynon, Hunt Valley, MD (US)

(73) Assignee: TARKETT INC., Farnham, Quebec (CA)

( * ) Notice: Subject to any disclaimer, the term of this patent is extended or adjusted under 35 U.S.C. 154(b) by 0 days.

(21) Appl. No.: 15/249,216

(22) Filed: Aug. 26, 2016

(65) Prior Publication Data

US 2017/0067210 A1    Mar. 9, 2017

Related U.S. Application Data

(60) Provisional application No. 62/214,675, filed on Sep. 4, 2015.

(51) Int. Cl.
*E01C 5/20* (2006.01)
*B29C 39/00* (2006.01)
(Continued)

(52) U.S. Cl.
CPC .............. *E01C 5/20* (2013.01); *B29C 39/003* (2013.01); *B29C 39/36* (2013.01); *C09D 5/00* (2013.01);
(Continued)

(58) Field of Classification Search
CPC ..... E01C 5/20; E01C 2201/20; B29C 39/003; B29C 39/36; B29C 37/0025;
(Continued)

(56) References Cited

U.S. PATENT DOCUMENTS 6,061,980 A * 5/2000 Poiencot .............. A01K 1/0157
  52/177
6,387,504 B1   5/2002 Mushovic
(Continued)

FOREIGN PATENT DOCUMENTS

DE    19726502 C1    7/1998
JP    2013023832 A   2/2013

OTHER PUBLICATIONS

Web Article: "8mm Stone Flex Tiles—Slip-Resistant Pool, Patio, and Deck Flooring," Rubber Flooring Inc., 2015. https://www.rubberflooringinc.com/garage/8mm-stone-flex-tiles.html.
(Continued)

*Primary Examiner* — Raymond W Addie
(74) *Attorney, Agent, or Firm* — Winston & Strawn LLP (57) ABSTRACT

An artificial paver comprises a physical member adapted to have a structure shape of a paver and located on the top surface of a paving area. The physical member may be made of a two-component polyurethane material, and the two-component material may be formulated to characterize the artificial paver to be softer than a stone or concrete paving object and to exhibit higher shock absorbing properties than the stone or concrete paving object. A method for manufacturing the artificial paver is also contemplated. The method may comprise pouring the two-component polyurethane material into molds, allowing the two-component polyurethane material in the molds to cure, demolding the cured two-component polyurethane material, and applying an UV stable polyurethane and slip-resistant coating to a surface of the demolded two-component polyurethane material.

13 Claims, 9 Drawing Sheets

(51) Int. Cl.
*B29C 39/36* (2006.01)
*C09D 5/28* (2006.01)
*C09D 5/00* (2006.01)
*C09D 175/04* (2006.01)
*B29K 75/00* (2006.01)
*B29L 31/10* (2006.01)

(52) U.S. Cl.
CPC ............. *C09D 5/28* (2013.01); *C09D 175/04* (2013.01); *B29K 2075/00* (2013.01); *B29L 2031/10* (2013.01); *E01C 2201/20* (2013.01)

(58) Field of Classification Search
CPC .... B29K 2075/00; C08J 2375/04; C09D 5/00; C09D 5/28; B29L 2031/10
USPC .............................. 404/34–36, 41–45, 72–76
See application file for complete search history.

(56) References Cited

U.S. PATENT DOCUMENTS

| | | |
|---|---|---|
| D540,954 S | 4/2007 | Bouchard |
| D553,260 S | 10/2007 | Castonguay et al. |
| D584,834 S | 1/2009 | Lacas |
| D586,925 S | 2/2009 | Riccobene |
| D601,268 S | 9/2009 | Hanna |
| D602,604 S | 10/2009 | Harris |
| D603,061 S | 10/2009 | Harris |
| D603,062 S | 10/2009 | Harris |
| D621,967 S | 8/2010 | King |
| D622,419 S | 8/2010 | King |
| D622,420 S | 8/2010 | King |
| D644,744 S | 9/2011 | Meadows |
| D644,745 S | 9/2011 | Meadows |
| D644,746 S | 9/2011 | Meadows |
| D644,747 S | 9/2011 | Meadows |
| D644,748 S | 9/2011 | Meadows |
| D644,749 S | 9/2011 | Meadows |
| D661,409 S | 6/2012 | Riccobene |
| D675,345 S | 1/2013 | Von Langsdorff |
| 8,464,486 B1* | 6/2013 | Elliott ................... E04F 15/225 52/403.1 |
| D686,346 S | 7/2013 | Riccobene et al. |
| D689,624 S | 9/2013 | Pacitto |
| D690,437 S | 9/2013 | Burnquist et al. |
| D695,915 S | 12/2013 | Dignard et al. |
| D695,916 S | 12/2013 | Dignard et al. |
| D695,917 S | 12/2013 | Dignard et al. |
| D695,918 S | 12/2013 | Dignard et al. |
| D695,919 S | 12/2013 | Dignard et al. |
| D695,920 S | 12/2013 | Dignard |
| D695,921 S | 12/2013 | Dignard |
| D695,922 S | 12/2013 | Dignard |
| 8,653,156 B2 | 2/2014 | Ong et al. |
| D701,619 S | 3/2014 | Pacitto |
| D704,863 S | 5/2014 | Yaw |
| 8,747,019 B2 | 6/2014 | Castonguay et al. |
| 8,769,896 B2 | 7/2014 | Lacas et al. |
| 8,771,506 B2* | 7/2014 | Pomerleau .............. C02F 1/004 210/170.03 |
| 8,808,840 B2 | 8/2014 | Chen |
| D712,569 S | 9/2014 | Lengacher et al. |
| 8,820,022 B1* | 9/2014 | Riccobene ................ E01C 5/06 404/34 |
| D718,888 S | 12/2014 | Schwarz et al. |
| D721,444 S | 1/2015 | Schwarz et al. |
| 2004/0069924 A1 | 4/2004 | Lemieux et al. |
| 2007/0258767 A1* | 11/2007 | Tapp ......................... B32B 5/02 404/36 |
| 2008/0213538 A1 | 9/2008 | Gasparpvic |
| 2009/0056257 A1* | 3/2009 | Mollinger ............ B29C 37/0032 52/314 |
| 2011/0030292 A1 | 2/2011 | Oram et al. |
| 2011/0185662 A1 | 8/2011 | Mollinger et al. |
| 2011/0268502 A1 | 11/2011 | Kurtzman |
| 2011/0299923 A1* | 12/2011 | Bleile ..................... E01C 5/001 404/35 |
| 2012/0034030 A1* | 2/2012 | Smith ..................... E01C 5/001 404/34 |
| 2013/0011195 A1* | 1/2013 | Bower .................... C03C 12/00 404/31 |
| 2013/0170907 A1* | 7/2013 | Gunn ........................ E01C 9/08 404/36 |
| 2013/0171377 A1 | 7/2013 | Aravamudan |
| 2013/0209170 A1* | 8/2013 | Doman ..................... E01C 5/02 404/34 |
| 2013/0216307 A1* | 8/2013 | Weaver ................. E01C 23/065 404/75 |
| 2013/0248674 A1* | 9/2013 | Johnson ................ B29C 44/181 248/346.02 |
| 2014/0087187 A1 | 3/2014 | Hawley |
| 2014/0161525 A1* | 6/2014 | Smith ....................... E01C 5/18 404/41 |
| 2014/0193197 A1* | 7/2014 | Cvetezar .................. C08J 11/06 404/72 |
| 2016/0097170 A1* | 4/2016 | Ungerleider ............ C04B 30/00 244/110 R |

OTHER PUBLICATIONS

Web Article: "Stone-Loc Tiles—Free Shipping Real Stone Look Basement Tile," Rubber Flooring Inc., 2015. https://www.rubberflooringinc.com/interlocking-tile/stone-loc-tiles.html.
Web Article: "⅜"Life Floor Slate Tiles—Slip-Resistant Pool, Patio, and Deck Flooring," Rubber Flooring Inc., 2015. https://www.rubberflooringinc.com/interlocking-tile/foam/life-floor-slate-tiles.html.
Web Article: "Envee Stone Clone Vinyl Tiles—Loose Lay Flooring," Rubber Flooring Inc., 2015. https://www.rubberflooringinc.com/vinyl-flooring/envee-stone-vinyl-tiles.html.
Web Article: "Nexus Stone Peel & Stick Tile—Disounted Vinyl Flooring," Rubber Flooring Inc., 2015. https://www.rubberflooringinc.com/vinyl-flooring/stone-peel-and-stick-vinyl-tiles.html.
Web Article: "Track BSS3000," Beynon: A Tarkett Sports Company, 2010. www.beynonsports.com.
Web Article: "Hard Harvard Surface. Easy Beynon Solution," Beynon: A Tarkett Sports Company, 2011. www.beynonsports.com.
Web Article: "Polyturf: Full-Depth System," Beynon: A Tarkett Sports Company, 2002. www.beynonsports.com.
Web Article: "BSS 1000: Dual Durometer Track System," Beynon: A Tarkett Sports Company, 2002. www. beynonsports.com.
Web Article: "Polyturf Plus Dual Durometer System," Beynon: A Tarkett Sports Company, 2002. www.beynonsports.com.

* cited by examiner

ARTIFICIAL PAVERS AND METHODS FOR MANUFACTURING ARTIFICIAL PAVERS

CROSS-REFERENCE TO RELATED APPLICATION

This application claims the benefit of U.S. Provisional Application No. 62/214,675, filed Sep. 4, 2015, the entirety of which is herein incorporated by reference.

FIELD OF INVENTION

The present invention is related to artificial pavers and methods for manufacturing artificial pavers and, more particularly, to artificial pavers and methods for manufacturing artificial pavers comprising pour-molded two-component polyurethane.

BACKGROUND OF THE INVENTION

Surfaces, such as walkways, driveways, patios, floors, work surfaces, walls and other interior or exterior surfaces can be covered with flagstones, stones, bricks, and other natural paving objects for durability and aesthetics. These surfaces are usually constructed by fitting together irregularly sized and shaped naturally paving objects. This work is labor intensive, and accordingly expensive, as it requires a skilled stonemason to select, cut, and fit the natural paving objects. Various efforts have rigorously been made to develop artificial paving objects with the appearance of flagstones, stones, bricks, and other natural paving objects. Such artificial paving objects as opposed to natural paving objects are usually relatively inexpensive to produce, and thus reduce the overall cost in constructing such a surface. One disadvantage has been these products may not provide a sufficiently aesthetically pleasing appearance with a degree of natural irregularity. In addition to this, the current available artificial paving objects in the market generally involve complex manufacturing processes and/or exhibit poor shock absorbing performance.

Moreover, each year millions of adults aged 65 and older fall. Falls can cause moderate to severe injuries, such as hip fractures and head traumas, and can increase the risk of early death. One out of three older adults (those aged 65 or older) falls each year. Among older adults, falls are the leading cause of both fatal and nonfatal injuries. In 2013, 2.5 million nonfatal falls among older adults were treated in emergency departments and more than 734,000 of these patients were hospitalized. In 2013, the direct medical costs of falls, adjusted for inflation, were $34 billion.

Twenty to thirty percent of people who fall suffer moderate to severe injuries such as lacerations, hip fractures, and head traumas. These injuries can make it hard to get around or live independently, and increase the risk of early death. Falls are the most common cause of traumatic brain injuries (TBI). About one-half of fatal falls among older adults are due to TBI. Most fractures among older adults are caused by falls. The most common are fractures of the spine, hip, forearm, leg, ankle, pelvis, upper arm and hand.

Many people who fall, even if they are not injured, develop a fear of falling. This fear may cause them to limit their activities, which leads to reduced mobility and loss of physical fitness, and in turn increases their actual risk of falling.

Consequently, there remains a yet unmet need for improved artificial pavers and methods for manufacturing artificial pavers that are inexpensive to produce. Such an improved artificial paver may be one wherein the surface of the artificial paver exhibits an efficient shock absorbing effect, which can reduce the probability of injury when falling or tripping, while still mimicking the appearance of natural stone, wood, brick and concrete pavers. Such an improved artificial paver may also be one wherein the surface of the artificial paver exhibits an efficient shock absorbing effect, which can reduce the probability of injury when falling or tripping, while having a specific shape such as rectangular, square, circular, elliptical, etc. or other specific shape desired by the manufacturers and customers. Such an improved artificial paver may likewise be one wherein the surface of the artificial paver exhibits an efficient shock absorbing effect, which can reduce the probability of injury when falling or tripping, without mimicking the appearance of any natural stone, wood, brick, and concert paver (e.g., a flat surface with no rock texture). The improved methods should comprise steps manufacturing the aforementioned improved artificial pavers.

SUMMARY OF THE INVENTION

In one embodiment of the artificial paver of the present invention, the artificial paver may comprise a physical member adapted to have a structure shape of a paver and located on the top surface of a paving area. The physical member may be made of a two-component polyurethane material. The two-component polyurethane material may be formulated to characterize the artificial paver to be softer than a stone or concrete paving object and to exhibit higher shock absorbing properties than the stone or concrete paving object. The physical member may have a preferred thickness between 0.25 to 5 inches. The artificial paver may be an artificial stone, artificial concrete, an artificial slab, an artificial title, artificial brick, an artificial wood, and other artificial paving object. The physical member may further comprise fillers such that the physical member is a composite. The fillers may include styrene butadiene rubber, polyurethane foam, or other filler material that may be used in conjunction with the two-component polyurethane material. In one variation, the physical member may be impermeable. In another variation, the physical member may be without adhesive qualities.

A paver system comprising the artificial paver is also contemplated. In one embodiment, the paver system may comprise a base, a physical member adapted to have a structure shape of a paver on the base and located on the top surface of a paving area and above the base, wherein the physical member is made of a two-component polyurethane material and the two-component polyurethane material is formulated to characterize the artificial paver to be softer than a stone or concrete paving object and to exhibit higher shock absorbing properties than the stone or concrete paving object, and grout on one or more sides of the physical member. The base, the physical member, and the grout may be arranged in a manner to allow water drainage.

A method for manufacturing the artificial paver is likewise contemplated. The method may comprise pouring a two-component polyurethane material into molds, wherein the two-component polyurethane material is formulated to characterize the artificial paver to be softer than a stone or concrete paving object and to exhibit higher shock absorbing properties than the stone or concrete paving object, allowing the two-component polyurethane material in the molds to cure, demolding the cured two-component polyurethane material, and applying a protective UV stable and slip-resistant coating to a surface of the demolded two-component polyurethane material. The applied protective UV stable and slip-resistant coating may mimic texture and slip resistance of the stone or concrete paving object. The method may further comprise adding pigments to color the demolded two-component polyurethane material, wherein the coloring mimics appearance of the stone or concrete paving object.

In another embodiment of the artificial paver of the present invention, the artificial paver may comprise a rigid layer made of a two-component polyurethane material and an elastic layer made of a foamed version of the two-component polyurethane material. The two-component polyurethane material may be formulated to characterize the rigid layer to be softer than a stone or concrete paving object and to exhibit higher shock absorbing properties than the stone or concrete paving object. The rigid layer may be the layer that individuals and vehicles come into contact with when walking and traveling on the artificial paver.

DETAILED DESCRIPTION OF THE INVENTION

The benefits, advantages and features of the present invention will become more fully apparent from the following inventive embodiments. Now generally referring to FIGS. 1-9, embodiments of the artificial paver will be outlined in greater detail referring to the presented numerals.

In accordance with principles of the present invention(s), an artificial paver is manufactured and provided that is made of two-component polyurethane that can be poured into a mold and cured in minutes at room temperature. The poured two-component polyurethane may be cured in approximately 2 to 10 minutes at room temperature. The polyurethane material is poured into a mold and once cured, can be demolded by hand or similar mechanical operation. In this embodiment, there is no need for other curing techniques such as heating in an oven which is needed for rubber. By simply pouring and curing in minutes, the physical structure of the paver can be formed. Color, granulation, coating, or other physical adaptation can be applied in forming the paver. The polyurethane material is formulated and formed to have certain physical and performance characteristics. The cured material is sufficiently soft to meet safety requirements such as those for use in public areas such as recreational playgrounds, while imparting the desired architectural or decorative effect of a natural or traditional paver. The cured material is soft but is also formulated to have a rigid surface that is resilient to foot or vehicle traffic (e.g., withstand being walked on with shoes, possibly heels, over a long time without being permanently deformed). In other words, it possesses surface rigidity while also providing shock absorption. The cured material may be softer than a naturally occurring paving object or a manufactured paving object. Those of ordinary skill in the art are able to prepare two-component polyurethane to implement the paver. The two-component polyurethane forms all or substantially all of the material that the paver is made of in this embodiment (e.g., fills the mold when poured). In other words, other materials can incorporate as long as they do not materially impact the curing and physical properties that are discussed above.

In some variations, the two-component polyurethane is used for a top layer of the paver to provide the surface rigidity and one or more underlying layers, potentially of a different material, are added to primarily provide additional shock absorbency. Such a composite structure can possibly employ different methods of producing the top and subsequent layers.

The paver, when formed, can be heavy because of the two-component polyurethane used to form the paver so that it can maintain its position on the ground without requiring adhesives. The weight is important in providing a similar product to natural paver because it can be similarly laid. Therefore, the paver as formed can have a weight or density that is comparable or less than a natural stone paver but is sufficient for installation in some projects by simply laying on the ground. If desired, alternatives are contemplated. A lighter version, e.g., flooring, is also contemplated.

Figure 1:
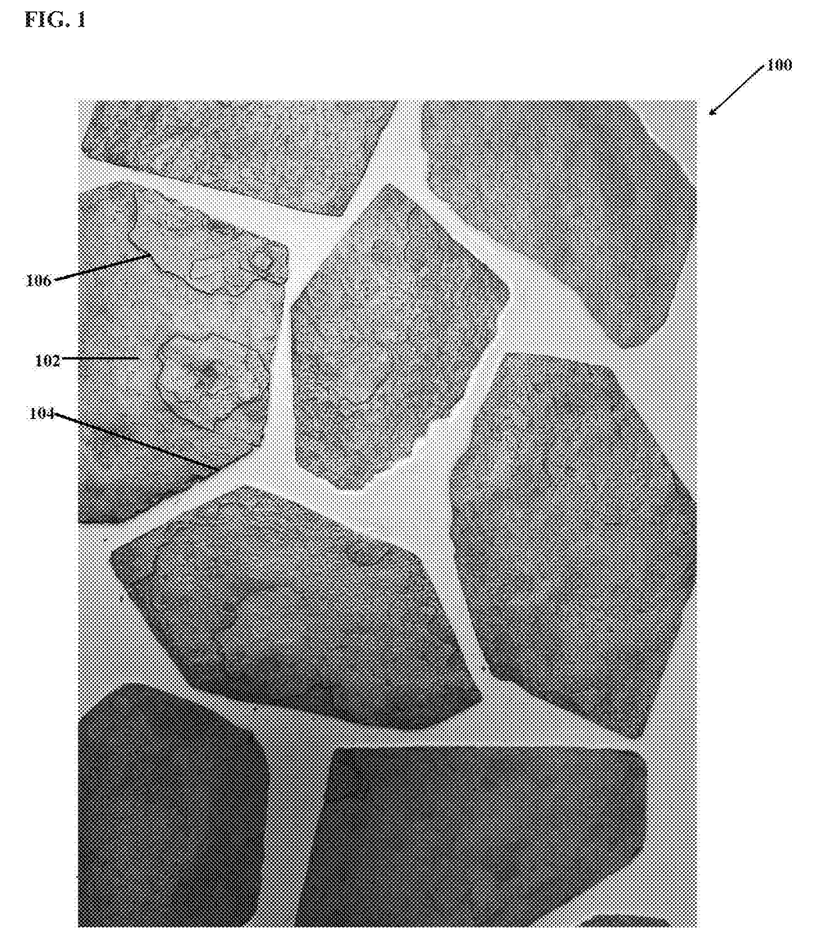
FIGS. 1-2 depict a schematic top plan view of an artificial paver in accordance with an embodiment of the present invention.
Figure 2:
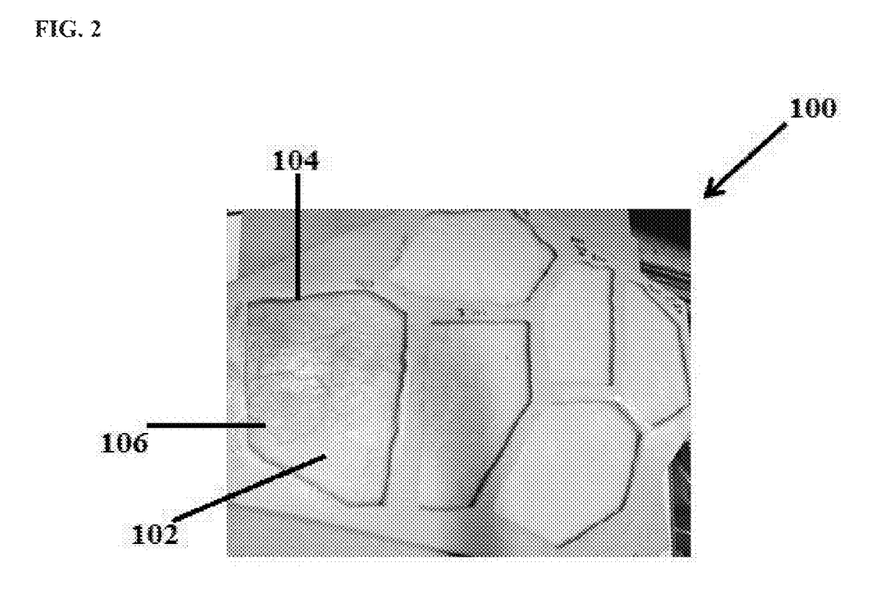
Figure 3:
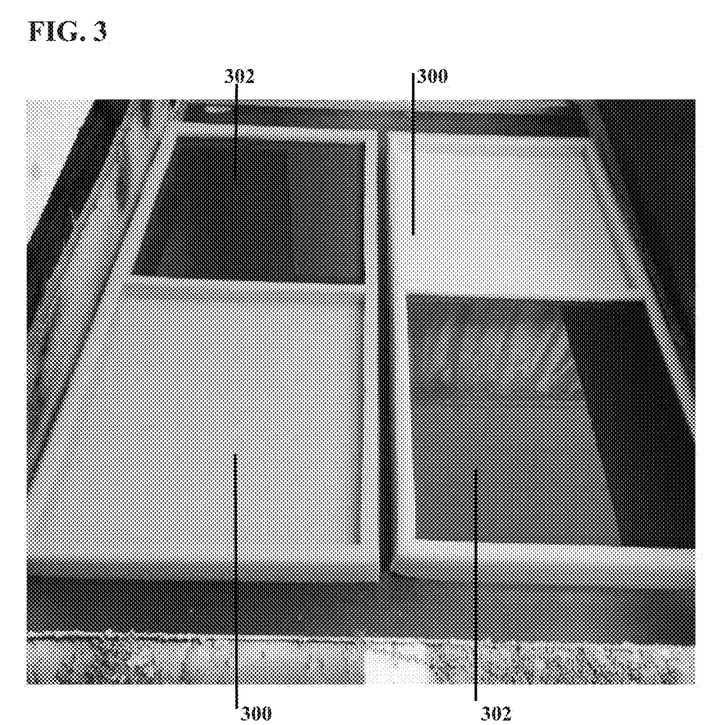
FIGS. 3-5 demonstrate some steps performed in the method for manufacturing the artificial paver using a two-component polyurethane material in accordance with an embodiment of the present invention.
Figure 4:
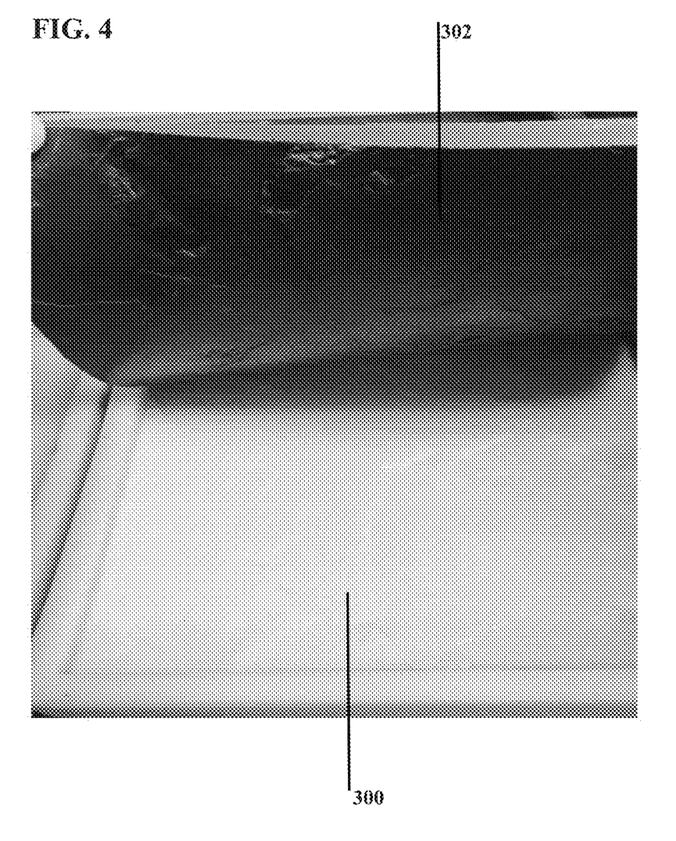
Figure 5:
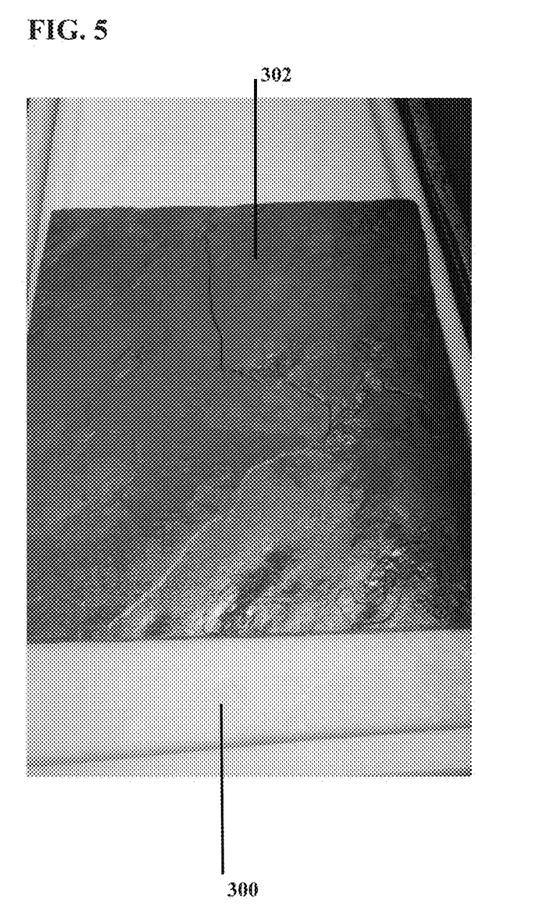
Figure 7:
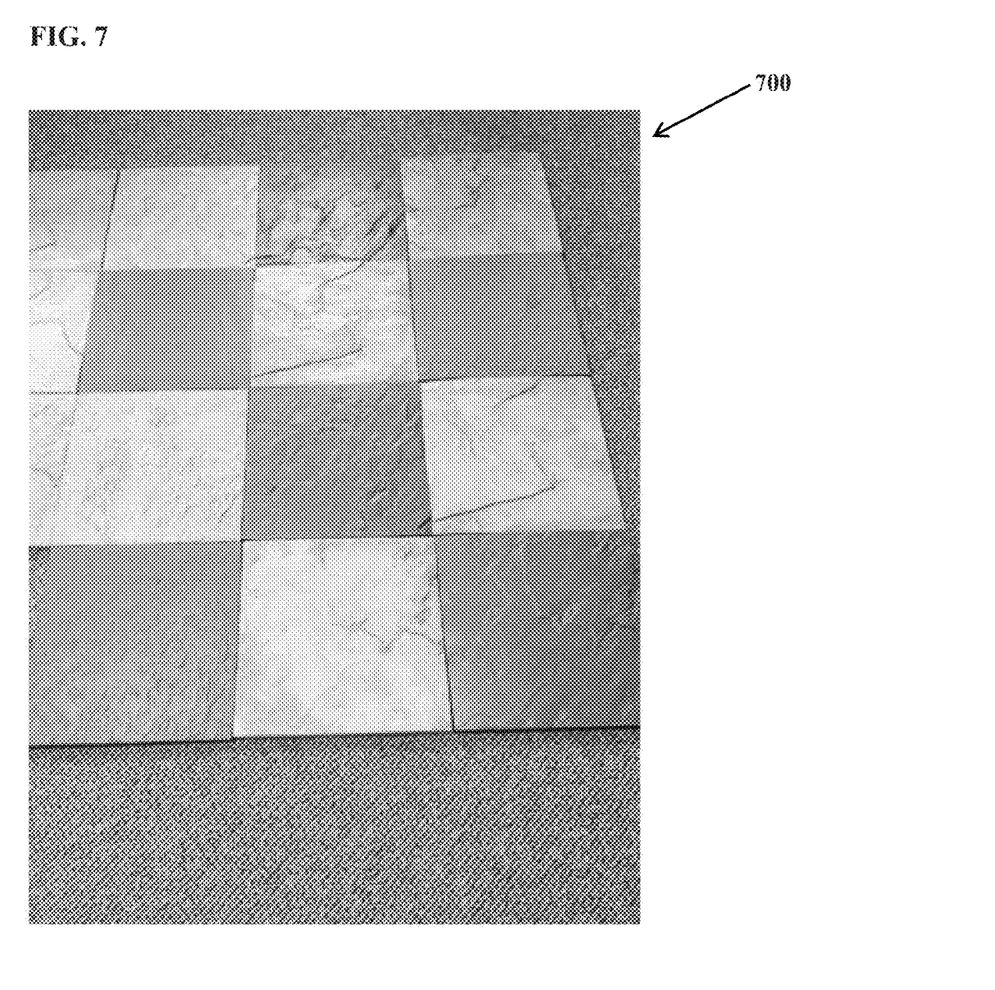
FIG. 7 depicts a surface constructed by the artificial pavers in accordance with an embodiment of the present invention.

FIGS. 1-2 and 7 illustrate a preferred embodiment of the invention, wherein a surface constructed of artificial paver 700 comprising two-component polyurethane is provided. As depicted in FIGS. 1-2, the paving objects 100 making up the illustrated surface 700, as depicted in FIG. 7, has a generally pentagonal or hexagonal body, but one of ordinary skill in the art will readily realize and appreciate that the body of the paving objects 100 of the surface 700, or the body of a portion of the surface, can in reality comprise any shape desired for a project. It would be beneficial for the paving objects 100 to be configured to easily engage with other paving objects in a mating arrangement forming surface 102. In this application, paving object 100 may also refer to an artificial paver associated with numeral 102, even though numeral 100 is pointing to a portion of the surface 700. A portion of the surface 700 may include one or more artificial pavers.

Paving objects 100 of surface 700 have surface 102 and plurality of sides 104. The angle created by any one of sides 104 mating with each other can assume a given angle. The structural integrity of the surface 700 should not be compromised by the arrangement. Surface 102 and sides 104 may assume a regular or irregular shape. In accordance with this embodiment, paving objects 100 may mimic flagstones, stones, bricks, and other natural paving objects used in constructing surface 700. An advantage of the two-component polyurethane is formulated to render or characterize the artificial paver 100 to be softer than a naturally occurring paving object. The artificial paver can have higher shock absorbing properties than the naturally occurring paving object. It should be understood that the naturally occurring paving object is the object that the artificial paver is imitating. The shock absorption range demonstrated by the two-component polyurethane that forms the artificial paving object is preferably within the range of 10-75% when compared to concrete or stone pavers, or other natural paving objects. Concrete, stone pavers, or other natural paving objects are a reference, and are considered to have 0% shock absorption level in the comparison. In this embodiment, surface 102 may preferably be made by applying a colored polyurethane coating over the paving objects in order to obtain a more realistic natural stone look. Different colors can equally be applied in order to produce different shading and highlight effects. In accordance with this embodiment of the present invention, the artificial paver 100 may, for example, have a thickness between 0.25 to 5 inches, but other dimensions are also contemplated if desired.

In one embodiment, the artificial paver may be an artificial paver composite that comprises two-component polyurethane and one or more fillers. As used herein, the term "filler" refers to particles that are added to the two-component polyurethane to improve the artificial paver's physical properties. The fillers used may preferably include sterene butadiene rubber (SBR), polyurethane foam, and other filler material that may be used in conjunction with the two-component polyurethane or the similar material. The artificial paver composite may comprise a tough resilient layer made of the two-component polyurethane. The artificial paver composite may further comprise a foamed layer made of foamed two-component polyurethane. As used herein, the term "composite" refers to a material that is made from several different substances.

In yet another embodiment, the artificial paver may be an artificial paver composite that comprises a first material and a second material. The artificial paver composite may be produced by a mixture of the first material and the second material. The artificial paver composite may also be produced by a rigid layer (first material) and an elastic layer (second material) described below.

In any of the embodiments of this application, the artificial paver may be an artificial stone, an artificial concrete, an artificial slab, an artificial tile, an artificial wood, or any other artificial paving object 100 akin to the ones described herein.

In yet another embodiment of the present invention, the hereinbefore explained two-component polyurethane is employed to provide an artificial paver and is laid to a base, wherein an artificial paver comprises two-component polyurethane, and wherein the two-component polyurethane is formulated to characterize the artificial paver to be softer than a naturally occurring paving object that the artificial paver is imitating and to exhibit higher shock absorbing properties than the naturally occurring paving object that the artificial paver is imitating, and grout on one or more sides of the artificial paver, wherein the base, the artificial paver, and the grout are arranged in a manner to allow water drainage from the surface of the artificial paver. The grout may be a soft, flexible grout compatible with the artificial paver.

A method for manufacturing an artificial paver is described comprising pouring two-component polyurethane into molds 600, which is depicted in greater detail in FIGS. 3-6. The two-component polyurethane may be first mixed mechanically with a hand-applied mixer (or some other mechanical mixer) and then subsequently poured into molds 600. Different formulations of the two-component polyurethane may also be poured in separate steps to create an artificial paver with multiple layers.

Figure 6:
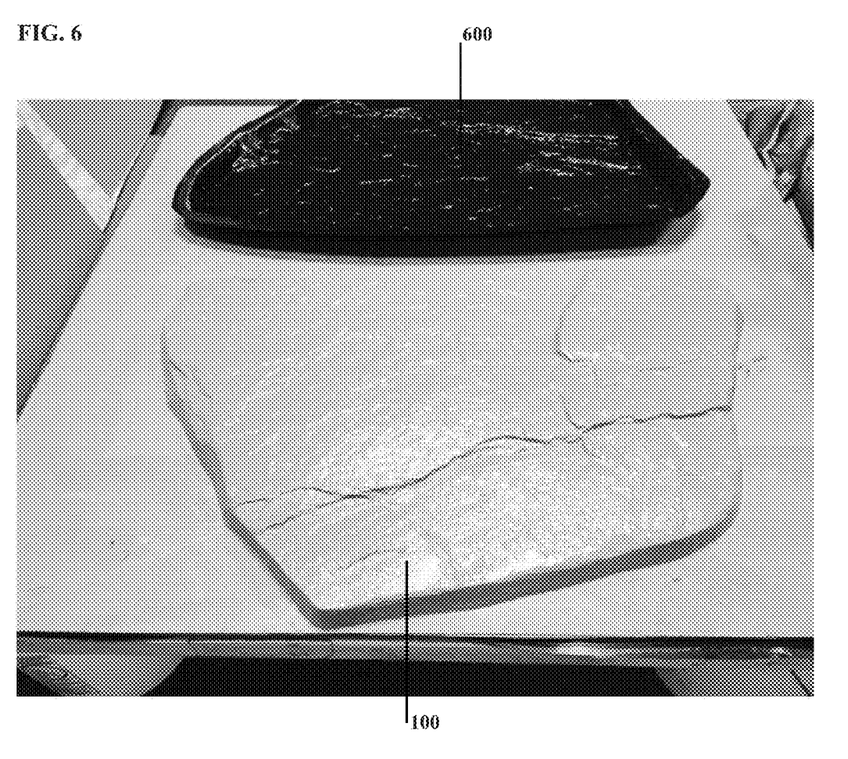
FIG. 6 shows a molded stone in accordance with an embodiment of the present invention.

For example, the method may comprise pouring a first material into molds 600, wherein the first material is made of two-component polyurethane solid elastomer formulation that is approximately 60-75 shore A hardness. The first material simulates the surface of a stone, concrete, or other naturally occurring paving object or manufactured paving object. The first material forms the top layer of the artificial paver. The first material provides good overall toughness, wear resistance, and UV stability. In a preferred embodiment, the first material is poured to a thickness between 20-25% of the overall thickness of the artificial paver. The two-component polyurethane solid elastomer formulation may further include multiple other ingredients such as polyols, fillers, pigments, catalysts, molecular sieve, polymeric isocyanate, or any combinations thereof.

The method may further comprise pouring a second material into molds 600 over the first material, wherein the second material is made of two component polyurethane microcellular foam formulation that is approximately 10-25 shore A hardness. The second material forms the base layer of the artificial paver and helps provide shock absorption to the artificial paver. In a preferred embodiment, the second material is poured to a thickness between 75-80% of the overall thickness of the artificial paver. The two component polyurethane microcellular foam formulation may further include multiple other ingredients such as polyols, fillers, pigments, catalysts, molecular sieve, polymeric isocyanate, or any combinations thereof.

It will be apparent to one of ordinary skill in the art that these molding procedures can be performed by pouring the first material and the second material one after the other or by first mechanically mixing the first material and the second material with a hand-applied mixer prior to pouring into molds 600. Preferably, when executing this method, two-component polyurethane is utilized. The second material may also be characterized by a softer polymer elastomer, polymer based foam, and/or polymer composite mixture that allows for good shock absorption.

Subsequent to pouring the second material 302 over the first material 300, the mixture in the molds 600 is allowed to cure. The above method may be employed to manufacture an artificial paver comprising a rigid layer and an elastic layer described below where the rigid layer is made of the first material and the elastic layer is made of the second material. As used herein this disclosure, the term "curing" in one embodiment may refer to the toughening or hardening of a polymer material mixture afforded by cross-linking of individual polymer chains. The term "curing" in another embodiment may refer to hardening of a mixture or a liquid. The term "curing" in yet another embodiment may refer to converting a material from a liquid state to a solid state. After curing is completed, demolding of the cured two-component polyurethane is conducted. Demolding should be understood as the step of removing the cured and hardened two-component polyurethane from molds 600, which can for example be done by hand. Other demolding techniques or operations may be used such as by mechanical operation that simulates demolding by hand, or by the use of compressed air. The demolding step is followed by applying a protective UV stable and slip-resistant coating to a surface of the demolded two-component polyurethane.

The method may further comprise adding pigments to color the artificial paver, wherein the coloring mimics appearance of the naturally occurring paving object that the artificial paver is imitating. Pigmented highlights may be applied to brushing the surface of the demolded two-component polyurethane followed by an overall wiping, which leaves the pigment in the crevasses and accentuates a more natural appearance. The pigments may include dry power iron oxides of different colors. Another option is to use a formulation comprising a waterbased, aliphatic polyurethane pigmented coating. This coating may comprise or be consisted of waterbased polyurethane dispersions, fillers, UV stabilizers, leveling additives, defoaming additives, rheology modifiers, pigments, anti-microbial additives, and slip resistant additives. FIG. 6 depicts a molded stone prior to adding and applying the colored highlights and pigments and the finished textured coating. FIG. 7 shows the artificial paver 700 after finishing the molding process with the above addition and application.

Figure 8A:
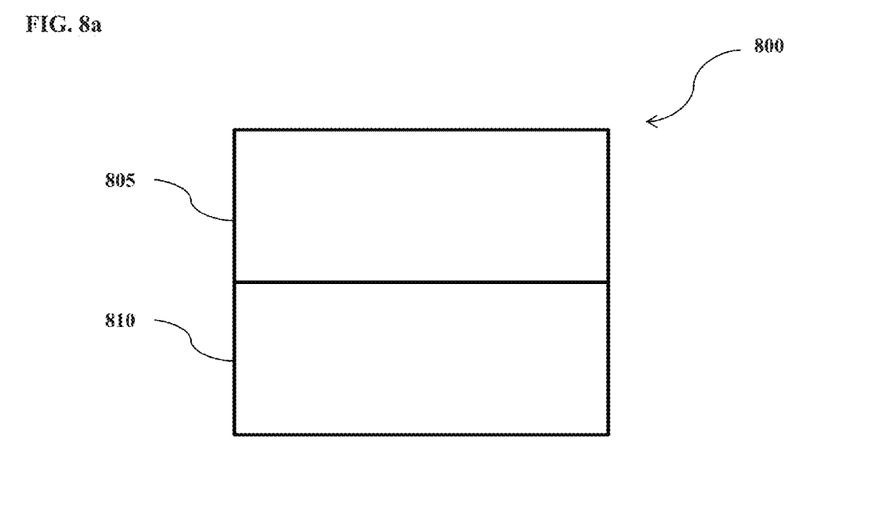
FIG. 8 depicts an artificial paver comprising a ridged layer and an elastic layer in accordance with an embodiment of the present invention.
Figure 8B:
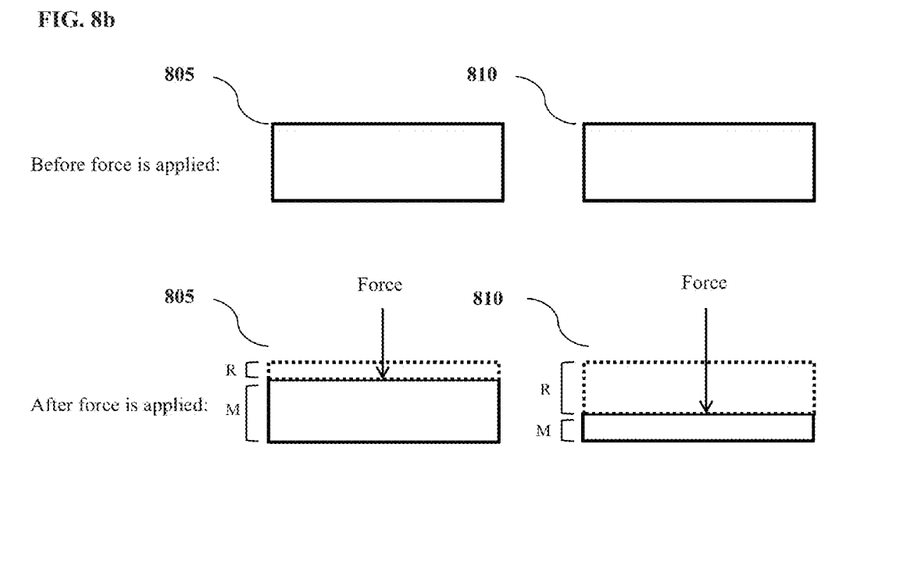

In some embodiments, the artificial paver 800 may comprise a rigid layer 805 and an elastic layer 810 as shown in FIG. 8*a*. The rigid layer 805 is a tougher, harder layer whereas the elastic layer 810 is a softer, more flexible layer. The rigid layer 805, in a preferred embodiment, may comprise two-component polyurethane. The elastic layer 810, in a preferred embodiment, may comprise either a foamed version of two-component polyurethane or a foamed version of polyurethane. The elastic layer 810 may also comprise foamed versions of other types polymers such as synthetic rubber, natural rubber, silicon, polyester, PTFE, TPV, ABS, or any combinations thereof. Rigidity or elasticity, in one embodiment, may refer to an amount of compression exhibits by the layer when an amount of force is applied to the layer. This rigidity or elasticity is illustrated in FIG. 8*b*. The amount of compression may refer to an amount of reduction (R) on the layer in the direction in which force is applied when force is applied on the layer. This reduction may be a reduction in the thickness, height, width, or length of the layer. The amount of compression may also refer to the measurement (M) of the layer in the direction in which force is applied when force is applied on the layer. For rigid layer 805, the amount of reduction (R) is smaller compared to elastic layer 810, and the measurement (M) of the layer in the direction in which force is applied is larger compared to elastic layer 810 when force is applied. For elastic layer 810, the amount of reduction (R) is larger compared to rigid layer 810, and the measurement (M) of the in the direction in which force is applied is smaller compared to rigid layer 810 when force is applied. Rigid layer 805 and elastic layer 810 exhibit these characteristics when force is applied to each individual layer, as opposed to a layer combining both rigid layer 805 and elastic layer 810.

In FIG. 8*a*, artificial paver 800 may represent the whole artificial paver or a portion of the whole artificial paver. Similarly in FIG. 8*b*, rigid layer 805 may represent the entire rigid layer or a portion of the entire rigid layer. Elastic layer 810 may represent the entire elastic layer or a portion of the entire elastic layer. When artificial paver 800 is laid in an unpaved surface, a first surface of elastic layer 810 contacts the unpaved surface and a second surface of elastic layer 810 opposite to the first surface of elastic layer 810 contacts a first surface of rigid layer 805. A second surface of rigid layer 805 opposite to the first surface of rigid layer 806 is the walking surface or the surface with which pedestrians and vehicles would come in contact with when traveling on the surface.

Although FIGS. 8*a* and 8*b* depict that rigid layer 805 and elastic layer 810 have the same measurement in the direction in which force is applied, they may have different measurements in some embodiments. There may also be multiple rigid layers 805 above the elastic layer 810, multiple elastic layers 810 below the rigid layer 805, or multiple rigid layers 805 and multiple elastic layers 810 even though the figures show only one single layer of rigid layer 805 and only one single layer of elastic layer 810.

Figure 9:
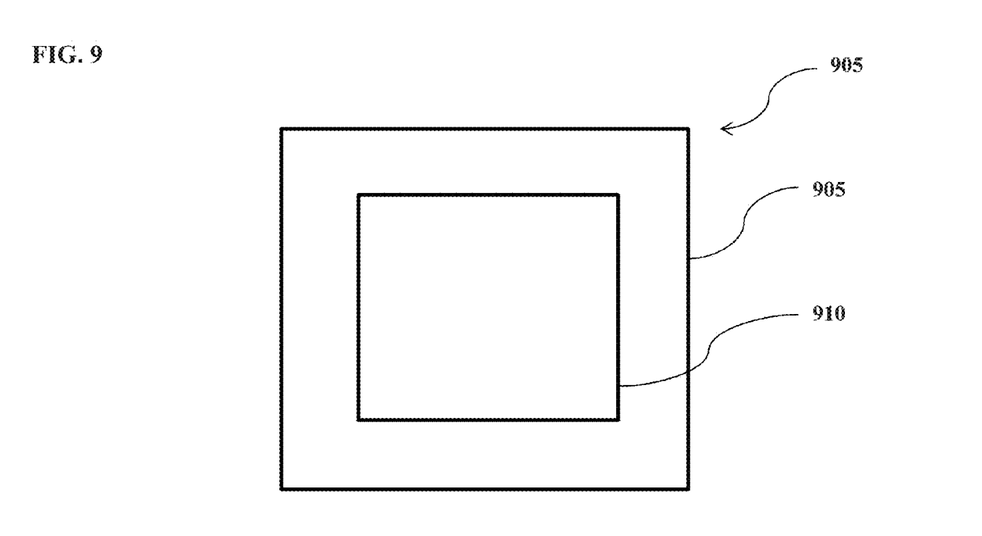
FIG. 9 depicts an artificial paver comprising a slightly harder, tougher polyurethane material and a softer inter-core material encapsulated by the slightly harder, tougher polyurethane material.

In some embodiments, the artificial paver 900 may comprise a slightly harder, tougher polyurethane material 905 and a softer inter-core material 910 encapsulated by the slightly harder, tougher polyurethane material 905 as shown in FIG. 9. The slightly harder, tougher polyurethane material 905 may be made of two-component polyurethane. The softer inter-core material 910 is fully encapsulated by slightly harder, tougher polyurethane material 905 such that the softer inter-core material 910 is unexposed to the environment or air. The softer inter-core material may comprise polyurethane foam, polyethylene foam, expanded polyethylene foam, polystyrene foam, neoprene foam, rubber foam, recycled polyurethane foam shreddings, recycled SBR tire granules, any combinations thereof.

Based on the structures and the methods discussed in this application, an artificial paver comprising two-component polyurethane or an artificial paver comprising a rigid layer including (or a rigid layer of) two-component polyurethane and an elastic layer including (or an elastic layer of) a foamed version of two-component polyurethane have a softer feel compared to an artificial paver comprising other types of polymers, rubber, or synthetics. Such a softer feel helps reducing higher force and absorbing higher shock while still maintaining a hardness that can support the weight of pedestrians and vehicles and that does not interfere foot movement (such as walking on the artificial paver with high heels) and wheel movement. Such an artificial paver can also withstand wears caused by weather better, and thus lasts longer. Such an artificial paver further provides better adhesion to an unpaved surface when an adhesive is utilized compared to other artificial pavers when the same adhesive is employed.

An artificial paver comprising a rigid layer including (or a rigid layer of) two-component polyurethane and an elastic layer including (or an elastic layer of) two-component polyurethane render to the artificial paver to be softer than a naturally occurring paving object that the artificial paver is imitating and to exhibit higher shock absorbing properties than the naturally occurring paving object that the artificial paver is imitating. These characteristics may be produced due to the two layer structure, the formulation of the two-component polyurethane in each layer, which may be the same or different, or both the two-layer structure and the formulation. For the rigid layer, it may comprise two-component polyurethane. For the elastic layer, it may comprise either a foamed version of two-component polyurethane or a foamed version of polyurethane. It may also comprise foamed versions of other types polymers such as synthetic rubber, natural rubber, silicon, polyester, PTFE, TPV, ABS, or any combinations thereof.

A naturally occurring paving object may be a natural product suitable for paving a surface. The natural product is suitable for paving a surface without any mechanical or chemical processing to alter physical properties of the natural product and can be laid as is to support weight of individuals and/or vehicles. A naturally occurring paving object may also be a natural product commonly used in a pavement. A natural product commonly used in pavement may refer to a natural product or natural products that are used in the majority pavements in a random selection of pavements. A naturally occurring paving object, for example, may be natural stone (such as flagstone, cobblestone, sett, and other similar natural stone), natural wood (such as pine, spruce, larch, and other similar wood), natural bamboo, natural metal, and other similar natural paving objects. Instead of imitating a naturally occurring paving object, the artificial paver may also mimic manufactured paving objects such as concrete, brick, tile, glass, asphalt, and other similar manufactured paving object.

Artificial pavers and paver systems discussed in this application may comprise a physical member adapted to have a structure shape of a paver located on the top surface of a paving area. The physical member may be made of two-component polyurethane, and the two-component polyurethane may be formulated to characterize the artificial paver to be softer than a stone or concrete paving object, to exhibit higher force reduction than the stone or concrete paving object, and to exhibit higher shock absorbing properties than the stone or concrete paving object. The physical member may be the artificial paver itself or part of the artificial paver. As such, all the features associated with the artificial paver are equally applicable to the physical member.

A formulation of the two-component polyurethane may be 100% solids elastomer or a combination of a tougher, harder elastomer and a soft polyurethane foam.

In some embodiments, the term "two-component polyurethane" may refer to "pour-molded two-component polyurethane." The latter term indicates that the artificial paver, the physical member, or a layer (such as the rigid layer, the first material, the slightly harder, tougher polyurethane material, etc.) in either the artificial paver or physical member is a product formed by pouring molten two-component polyurethane into molds, shaping the molten two-component polyurethane in the molds, curing the molten two-component polyurethane in the molds, and demolding the cured two-component polyurethane from the molds or a product capable of being formed in that manner. This product may also be formed by the manufacturing method discussed earlier or be a product capable of being formed by that method. In some embodiments, the term "higher shock absorbing properties" is synonymous with higher force reduction.

In some embodiments, the term "two-component polyurethane" may also refer to a two-component polyurethane material that its dominant or primary physical and chemical characteristics are that of two-component polyurethane such as in a solution of materials such that in the primary application (natural pavers) the solution has such fluidity when poured into the mold that it fills and forms the stone texturing on the mold.

A material that has the same or similar physical and curing characteristics as the two-component polyurethane may also be employed to substitute the two-component polyurethane. Same or similar physical characteristics may include viscosity of the material in liquid form, fluidity of the material in liquid form, rigidity of the material after curing, weight of the material after curing, and/or shock absorbency of the material after curing. In some embodiments, rigidity of the two-component polyurethane and rigidity of the material are the same or similar after curing in the same conditions. In some embodiments, weight of the two-component polyurethane and the weight of the material are the same or similar after curing in the same conditions. The same conditions, in one embodiment, may refer to a curing process of hardening the two-component polyurethane or the material in the molds at room temperature by adding chemical additives that chemically crosslink polymer chains. The same conditions, in another embodiment, may refer to that the above curing process for the two-component polyurethane and the above curing process for the material are performed for the same duration. Same or similar curing characteristics may include a curing time in minutes at room temperature. A curing time in minutes at room temperature, in one embodiment, may refer to a curing process of hardening the two-component polyurethane or the material in the molds at room temperature by adding chemical additives that chemically crosslink polymer chains and the time the curing process takes to completely harden the two-component polyurethane or the material in the molds. The time may be 2 to 10 minutes. The curing process described in this paragraph can sometimes be referred to as open air molding process. As such, the material may be described as a liquid-poured material that can be chemically cured at room temperature within minutes. The material may be mixed with the two-component polyurethane to manufacture an artificial paver comprising that material and the two-component polyurethane. The material may also be mixed with the two-component polyurethane and fillers to manufacture an artificial paver composite comprising that material, the two-component polyurethane, and fillers.

Polymers such as synthetic rubber, silicon, polyester, polytetrafluoroethylene (PTFE), thermoplastic vulcanizates (TPV), rubbers, ABS, and foamed versions of those types materials do not have the same or similar physical and curing characteristics. For example, these polymers lack the viscosity or fluidity that allow them to be poured into the molds without difficulties. These polymers also need to be cured in an oven or at high temperatures to activate the crosslinking that gives these polymers their physical properties. Moreover, an artificial paver made by one or more of these polymers has a harder, more plastic-like feel, and thus a lower shock absorbency, compared to an artificial paver made of two-component polyurethane and/or the material.

In some embodiments, two-component polyurethane may be added to any of the above polymers to create a combination that has similar physical and curing characteristics. In the combination, the physical and curing characteristics of two-component polyurethane dominate the physical and curing characteristics of any of the above polymers. The combination has such fluidity when poured into the mold that it fills and forms the stone texturing on the mold. The artificial paver, physical member, first material, and rigid layer may be made of this combination.

Embodiments of the present invention refer to an artificial paver that would be laid, at the minimum, on the top surface (or the uppermost surface) of the ground or a paving area. The top surface (or the uppermost surface) is the walking surface, the surface where individuals and vehicles come into contact with when walking and traveling on that surface, or the surface used for walking and traveling. Additional artificial pavers may be laid below the top surface (or the uppermost surface) if necessary. As such, the constructed surface such as walkways, driveways, patios, floors, and work surfaces may comprise stacked artificial pavers. If desired, the top surface (or the uppermost surface) built with the artificial pavers may also be supported by underlying mat, underlying tile, or other building material that may be used under the artificial pavers.

In embodiments where an artificial paver comprises a rigid layer and an elastic layer, the rigid layer is the layer that individuals and vehicles come into contact with when walking and traveling on the artificial paver. In embodiments where an artificial paver comprises a slightly harder, tougher polyurethane material and a softer inter-core material, the slightly harder, tougher polyurethane material is the material that individuals and vehicles come into contact with when walking and traveling on the artificial paver. In embodiments where an artificial paver comprises a first material (or hard material) and a second material (or soft material), the first material is the material that individuals and vehicles come into contact with when walking and traveling on the artificial paver. In embodiments where an artificial paver comprises a tough resilient layer and a foam layer, the tough resilient layer is the layer that individuals and vehicles come into contact with when walking and traveling on the artificial paver.

When the artificial paver can be laid on an unpaved surface without any intermediary or underlying layers (e.g., mats, tiles, etc.) between the artificial paver and the unpaved surface, the laid artificial paver may stay in the laid position without wobbling and/or without moving from the laid position to another position when it comes into contact with individuals and vehicles traveling on the artificial paver. This may be achieved by the artificial paver having a sufficient weight. As such, adhesive is unnecessary but the artificial paver with a sufficient weight may also be installed with adhesive if desired. The artificial paver is not simply an adhesive layer for attaching two surfaces to each other. The artificial paver does not have or is substantially without adhesive qualities. Those of ordinary skill in the art will understand that material for the paver can be formulated for different specifications (e.g., weight bearing, shock absorbency, outdoor temperatures) and be able to prepare such formulations based on the information provided herein.

In some embodiments, the color of the artificial paver may be created by applying pigment, preferably iron oxide powers, or pigmented polyurethane coating. Multiple colors can be applied to produce different shading and highlight effects. This highlighting effect may be accomplished in several ways. One way is by applying the pigments directly into the mold prior to pouring the two-component polyurethane material. Another way is to apply the color highlights after the two-component polyurethane material has been cured and removed from the mold. The pigments can be brushed into various areas of the surface.

In some embodiments, the artificial paver or colored artificial paver may be further coated with a UA stable polyurethane clear coat. This clear coat helps add long term UV protection to the color of the artificial paver. This clear coat also provides overall wear ability, clean ability, and slip resistance to the surface. This clear coat may comprise waterbased polyurethane dispersions, fillers, UV stabilizers, leveling additives, defoaming additives, rheology modifiers, anti-microbial additives, and slip resistant additives. Other UV color stable coating may also be used. In some embodiments, clear coating may be reapplied with non-slip additive to rejuvenate the walking surface of the artificial paver.

Embodiments of the present invention may resemble the look of a naturally occurring paving object or a manufacturing paving object and can be produced with various shapes, sizes, and thicknesses.

Embodiments of the present invention may refer to an artificial paver that is impermeable or permeable. Preferably, embodiments of the present invention refer to an artificial paver that is impermeable.

Embodiments of present invention refer to an artificial paver that is not simply an adhesive layer for attaching two surfaces to each other. Once two-component polyurethane or the two-component polyurethane material is cured, the cured product does not have or is substantially without adhesive qualities.

In some embodiments, applications other than outdoor or indoor pavers are contemplated. For example, a tile (having a smooth or textured surface) can be made of two component polyurethane material. Other types of floor or ground surfacing would be understood to be contemplated. The artificial pavers are capable of being used for indoor and outdoor playgrounds, landscaping, or other weight bearing (human weight) applications. Other applications that are industrial or involve higher weight bearing use are contemplated.

The physical members are preferably generally flat, thus having a very short height profile as compared to the width and length.

Although any methods and materials similar or equivalent to those described herein can also be used in the practice of the present invention, exemplary methods and materials are described for illustrative purposes.

Further since numerous modifications and changes will readily be apparent to those having ordinary skill in the art, it is not desired to limit the invention to the exact constructions as demonstrated in this disclosure. Accordingly, all suitable modifications and equivalents may be resorted to falling within the scope of the invention. As such, the artificial paver can be molded into various shapes, sizes, and thicknesses.

Thus for example any sequence(s) and/or temporal order of steps of various processes or methods for sequence of system connections or operation) that are described herein are illustrative and should not be interpreted as being restrictive. Accordingly, it should be understood that although steps of various processes or methods or connections or sequence of operations may be shown and described as being in a sequence or temporal order, but they are not necessarily limited to being carried out in any particular sequence or order. For example, the steps in such processes or methods generally may be carried out in various different sequences and orders, while still falling within the scope of the present invention.

Although the present invention has been described and illustrated herein with referred to preferred embodiments, it will be apparent to those of ordinary skill in the art that other embodiments may perform similar functions and/or achieve like results. Thus, it should be understood that various features and aspects of the disclosed embodiments can be combined with, or substituted for one another in order to form varying modes of the disclosed invention. Many different embodiments such as variations, adaptations, modifications, and equivalent arrangements will be implicitly and explicitly disclosed by the embodiments described herein, and thus fall within the scope and spirit of the present invention, as long as all the desired inherent technical features and attributes are not lost.

Thus, the scope of the embodiments of the present invention should be determined by e appended claims and their legal equivalents rather than by the Figures.

What is claimed is:

1. An artificial paver comprising:
a physical member adapted to have a structure shape of a paver and located on the top surface of a paving area to be in contact with foot or vehicle traffic, and the physical member includes at least a surface layer that is made of a two-component polyurethane solid elastomer formulation that is capable of being cured at room temperature and is soft and resilient to foot or vehicle traffic.

2. The artificial paver according to claim 1, wherein the physical member has a thickness between 0.25 to 5 inches.

3. The artificial paver according to claim 1, wherein the physical member further comprising fillers such that the physical member is a composite.

4. The artificial paver according to claim 3, wherein the fillers include styrene butadiene rubber, polyurethane foam, or other filler material that may be used in conjunction with the two-component polyurethane solid elastomer formulation.

5. The artificial paver according to claim 1, wherein the artificial paver is an artificial stone, an artificial concrete, an artificial slab, an artificial tile, an artificial brick, an artificial wood, or other artificial paving object.

6. The artificial paver according to claim 1, wherein the physical member is impermeable.

7. The artificial paver according to claim 1, wherein the physical member is without adhesive qualities.

8. A paver system comprising:
a base;
a physical member adapted to have a structure shape of a paver on the base and located on the top surface of a paving area and above the base to be in contact with foot or vehicle traffic, wherein the physical member includes at least a surface layer that is made of a two-component polyurethane solid elastomer formulation that is capable of being cured at room temperature and is soft and resilient to foot or vehicle traffic; and
grout on one or more sides of the physical member.

9. The paver system according to claim 8, wherein the base, the physical member, and the grout are arranged in a manner to allow water drainage.

10. A method for manufacturing an artificial paver for receiving and contacting foot or vehicle traffic comprising:
pouring a two-component polyurethane solid elastomer formulation that is capable of being cured at room temperature into molds, wherein the two-component polyurethane solid elastomer formulation is formulated to make the artificial paver soft and resilient to foot or vehicle traffic;
allowing the two-component polyurethane solid elastomer formulation in the molds to cure;
demolding the cured two-component polyurethane solid elastomer formulation; and
applying an UV stable polyurethane and slip-resistant coating to a surface of the demolded two-component polyurethane solid elastomer formulation.

11. The method according to claim 10, wherein the applied UV stable polyurethane and slip-resistance coating mimics texture and slip resistant of a stone or concrete paving object.

12. The method according to claim 10, wherein the method further comprising adding pigments to color the demolded two-component polyurethane solid elastomer formulation, wherein the coloring mimics appearance of a stone or concrete paving object.

13. An artificial paver comprising:
an elastic layer made of a two-component polyurethane material, and a physical member made of a two-component polyurethane solid elastomer formulation that is capable of being cured at room temperature, wherein the physical member is the layer that individuals and vehicles come into contact with when walking and traveling on the artificial paver and is soft and resilient to foot and vehicle traffic.

* * * * *